United States Patent [19]

Sawase et al.

[11] Patent Number: 5,410,658
[45] Date of Patent: Apr. 25, 1995

[54] MICROPROCESSOR FOR CARRYING OUT A PLURALITY OF DIFFERENT MICROPROGRAMS AT THE SAME TIME AND METHOD FOR CONTROLLING THE MICROPROCESSOR

[75] Inventors: Terumi Sawase, Hanno; Yasushi Akao, Kokubunji, both of Japan

[73] Assignee: Hitachi, Ltd., Tokyo, Japan

[21] Appl. No.: 960,505

[22] Filed: Oct. 13, 1992

[30] Foreign Application Priority Data

Oct. 16, 1991 [JP] Japan .................................. 3-267790

[51] Int. Cl.$^6$ .............................................. G06T 9/06
[52] U.S. Cl. .................. 395/375; 364/232.8; 364/925.6
[58] Field of Search ............... 395/375, 500, 550, 725, 395/775, 800

[56] References Cited

U.S. PATENT DOCUMENTS

| 4,320,453 | 3/1982 | Roberts | 395/375 |
| 4,841,434 | 6/1989 | Mathews | 395/375 |
| 5,005,121 | 4/1991 | Nakada | 395/800 |

FOREIGN PATENT DOCUMENTS 56-108149  8/1981  Japan .

Primary Examiner—David Y. Eng
Attorney, Agent, or Firm—Fay, Sharpe, Beall, Fagan, Minnich & McKee

[57] ABSTRACT

The inventive microprocessor includes a first section which runs a microprogram pertinent to a macroinstruction and a second section which runs microprograms that are independent of the macroinstruction, with the first and second sections being operated selectively under time-division control. The microprocessor operates by either selecting one of a plurality of microaddress registers or a macroinstruction register, and by reading out the contents of the selected register for use as an address of a microinstruction memory, carrying out a process based on a microinstruction read out of the microinstruction memory in accordance with the address and generating a next macroinstruction address or next microinstruction address, making access to a macroinstruction memory in accordance with the next macroinstruction address thereby to read out a next macroinstruction, loading the next macroinstruction into the macroinstruction register, selecting one of the microaddress registers and loading the next microinstruction address into the selected microinstruction register, and controlling the selecting operations on a time-division basis.

33 Claims, 9 Drawing Sheets

T1: MICROINSTRUCTION READ CYCLE
T2: MICROINSTRUCTION EXECUTION CYCLE

5,410,658

MICROPROCESSOR FOR CARRYING OUT A PLURALITY OF DIFFERENT MICROPROGRAMS AT THE SAME TIME AND METHOD FOR CONTROLLING THE MICROPROCESSOR

BACKGROUND THE INVENTION

This invention relates to a microprocessor, and more particularly to a microprocessor and associated control method capable of dealing with both large-scale intricate program processing and fast program processing which is intended for real-time operation.

A microprogram-based processor is disclosed in Japanese Patent Unexamined Publication No. JP-A-56-108149, for example. This processor is based on a control scheme in which microinstruction routines common to many different macroinstructions are stored in a nano-instruction memory and used commonly for the execution of macroinstructions.

A microcomputer capable of running multiple independent programs is disclosed in the co-pending U.S. patent application Ser. No. 07/414,315 filed on Sep. 29, 1989 for example. This microcomputer includes a main processor and a subordinate processor. The main processor is a usual processor such as the one disclosed in the above patent publication JP-A-56-108149, for example, and the sub processor is a processor intended for real-time processing with the ability of running multiple independent programs quickly.

The processor of the above patent publication 56-108149 is designed to run multiple independent programs in such a manner that each program is created in the form of sub programs which are linked by a main program. However, because of sequential operations of sub programs, it is difficult for this processor to deal with fast real-time processing in which the processor needs to respond to input signals promptly.

The microcomputer disclosed in the co-pending application Ser. No. 07/414,315 is operative for both the usual program processing and fast real-time processing. However, this microcomputer inevitably has a large-scale circuit arrangement due to the two processors included in it.

SUMMARY OF THE INVENTION

An object of this invention is to provide a microprocessor of small-scale circuit arrangement and associated control method capable of dealing with both the usual large-scale program processing and fast program processing which is intended for real-time operation.

In order to achieve the above objective, the microprocessor of this invention includes a first section which runs a microprogram pertinent to a macroinstruction and a second section which runs microprograms that are independent of the macroinstruction, with the first and second sections being operated selectively under time-division control.

According to one aspect of this invention, the microprocessor comprises a plurality of microaddress registers for holding microaddresses, a macroinstruction memory for storing a plurality of macroinstructions, a microinstruction memory for storing a plurality of microinstructions, a first selector which either selects one of the microaddress registers or a macroinstruction register and delivers the contents of the selected register as an address of the microinstruction memory, a microinstruction control unit which carries out a process for the microinstruction read out of the microinstruction memory in accordance with the address and generates a next macroinstruction address or next microaddress, a macroinstruction read control unit which reads out a next macroinstruction from the macroinstruction memory in accordance with the next macroinstruction address and loads it into the macroinstruction register, a second selector which selects one of the microaddress registers and loads the next microinstruction address into the selected microaddress register, and a time division control unit which controls the selecting operations of the first and second selectors.

The inventive microprocessor operates to assign one of the microaddress registers to the processing of a macroprogram, and to assign the remaining microaddress registers to the microprograms which are run independently of the macroprogram. The processes associated with these address registers are carried out on a time-division basis in accordance with the operation of the first and second selectors so that the macroprogram and microprograms are run virtually concurrently.

Consequently, the inventive microprocessor can deal with both large-scale program processing and fast program processing which is intended for real-time operation, and can be configured in a small-scale circuit arrangement based on a single processor. In addition, through the programmed control of the operation of the time division control unit, a sequence of process optimal to a specific application system can be accomplished.

DESCRIPTION OF THE PREFERRED EMBODIMENTS

Embodiments of this invention will be described in detail with reference to the drawings. However, this invention is not confined to the following embodiments, but the invention includes applications and modifications of these embodiments disclosed in this specification and accompanying drawings.

Figure 1:
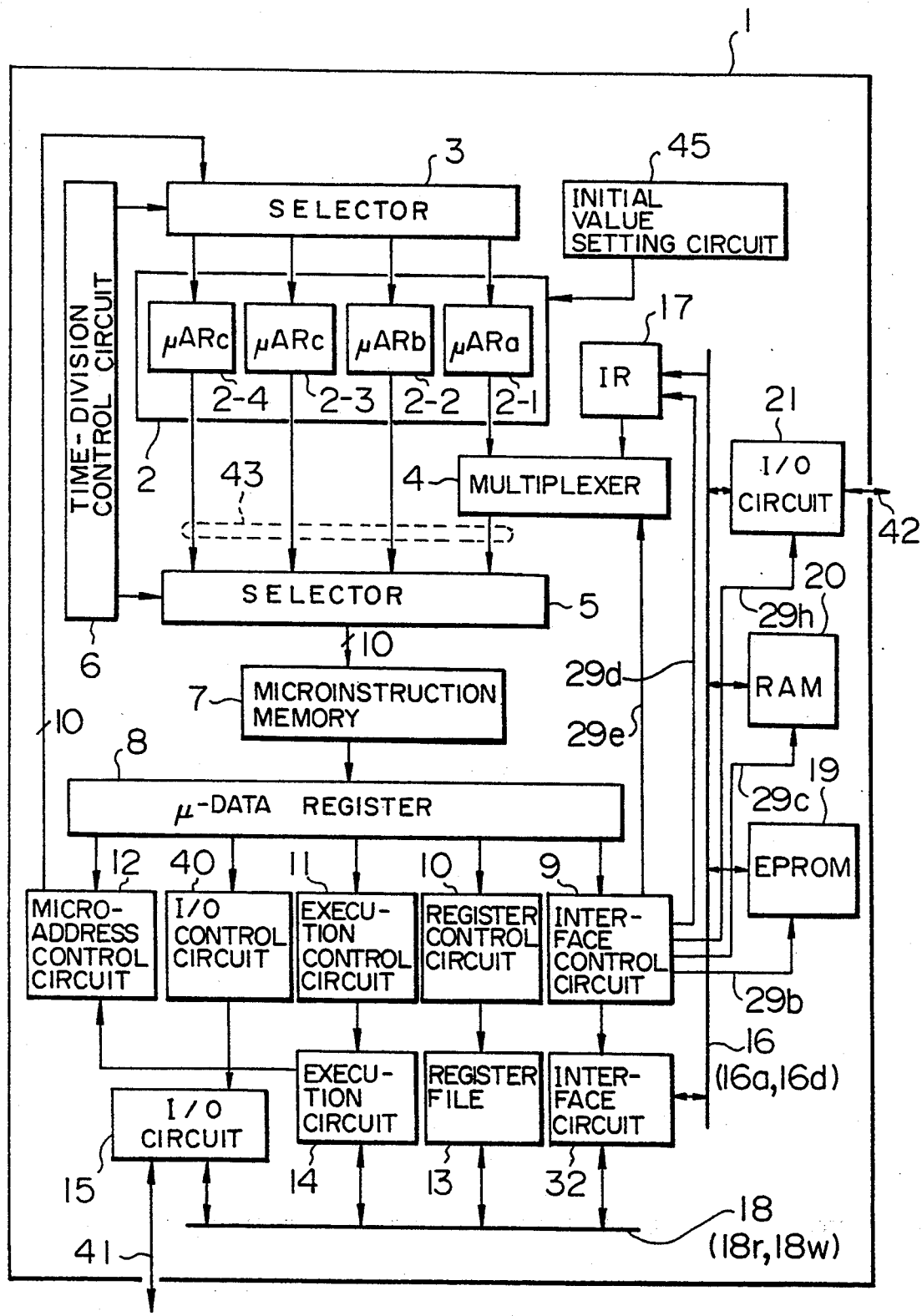
FIG. 1 is a block diagram of the microprocessor based on an embodiment of this invention.

FIG. 1 shows the arrangement of a microprocessor 1 based on an embodiment of this invention. The microprocessor 1 includes four 10-bit microaddress registers ($\mu$ARa–$\mu$ARd) 2-1 through 2-4.

These microaddress registers are initialized by an initial value setting circuit 45 to have the initial address of a microinstruction memory 7, and their inputs are connected to a selector 3 (hereinafter the "second selector"). The microaddress register 2-1 has its output connected to one input of a multiplexer 4, and the microaddress registers 2-2 through 2-4 have their outputs connected to the inputs of a selector 5 (hereinafter the "first selector").

The multiplexer 4 has another input connected to a macroinstruction register (IR) 17 and has its output connected to one input of the 5. The output of the first selector 5 carries the address information of the microinstruction memory 7. A time-division control circuit 6 controls the selecting operations of the second selector 3 and first selector 5.

Data stored in the microinstruction memory 7 consists of five fields: (1) address field, (2) input/output field, (3) operation field, (4) register field, and (5) interface field.

Part of the microinstruction memory 7 is used to store a set of microprograms which are used for the execution of macroinstructions. Field data read out of the microinstruction memory 7 is loaded into a microdata register 8.

The outputs of the microdata register 8 corresponding to the data fields are delivered to an interface control circuit 9, register control circuit 10, operation control circuit 11, microaddress control circuit 12, and input/output control circuit 40. These circuits 9–12 and 40 produce control signals for the processor 1. The interface control circuit 9 sends a signal of selection of either the microaddress register 2-1 or macroinstruction register 17 to the multiplexer 4. The circuit 9 is also connected with an interface circuit 32, which relays data between an execution internal data bus 18 and peripheral bus 16.

The register control circuit 10 is connected with a register file 13, which is a group of registers, and transacts data over the internal data bus 18. The execution control circuit 11 is connected with an operation circuit 14, which receives data from the interface circuit 32 over the executive data bus 18, processes the data, and sends the result of the process back to the interface circuit 32 and register file 13 over the internal data bus 18. The execution circuit 14 is also connected with the microaddress control circuit 12.

The input/output control circuit 40 is connected with an input/output circuit 15, which is connected to the internal data bus 18. The input/output circuit 15 performs data communication with devices outside the microprocessor over an input/output line 41.

The peripheral bus 16 is connected with an EPROM 19 for storing microprograms, RAM 20 for storing data, and input/output circuit 21. The input/output circuit 21 performs data communication with devices outside the microprocessor over an input/output line 42.

The microaddress control circuit 12 has a role of controlling the order of execution of the microprograms stored in the microinstruction memory 7, and it generates, in accordance with the contents of the address field described in the word which is being executed and the result of operation by the execution circuit 14, the address of the microinstruction memory to be executed next after the microinstruction which is being executed. This address is called "next address".

Figure 2:
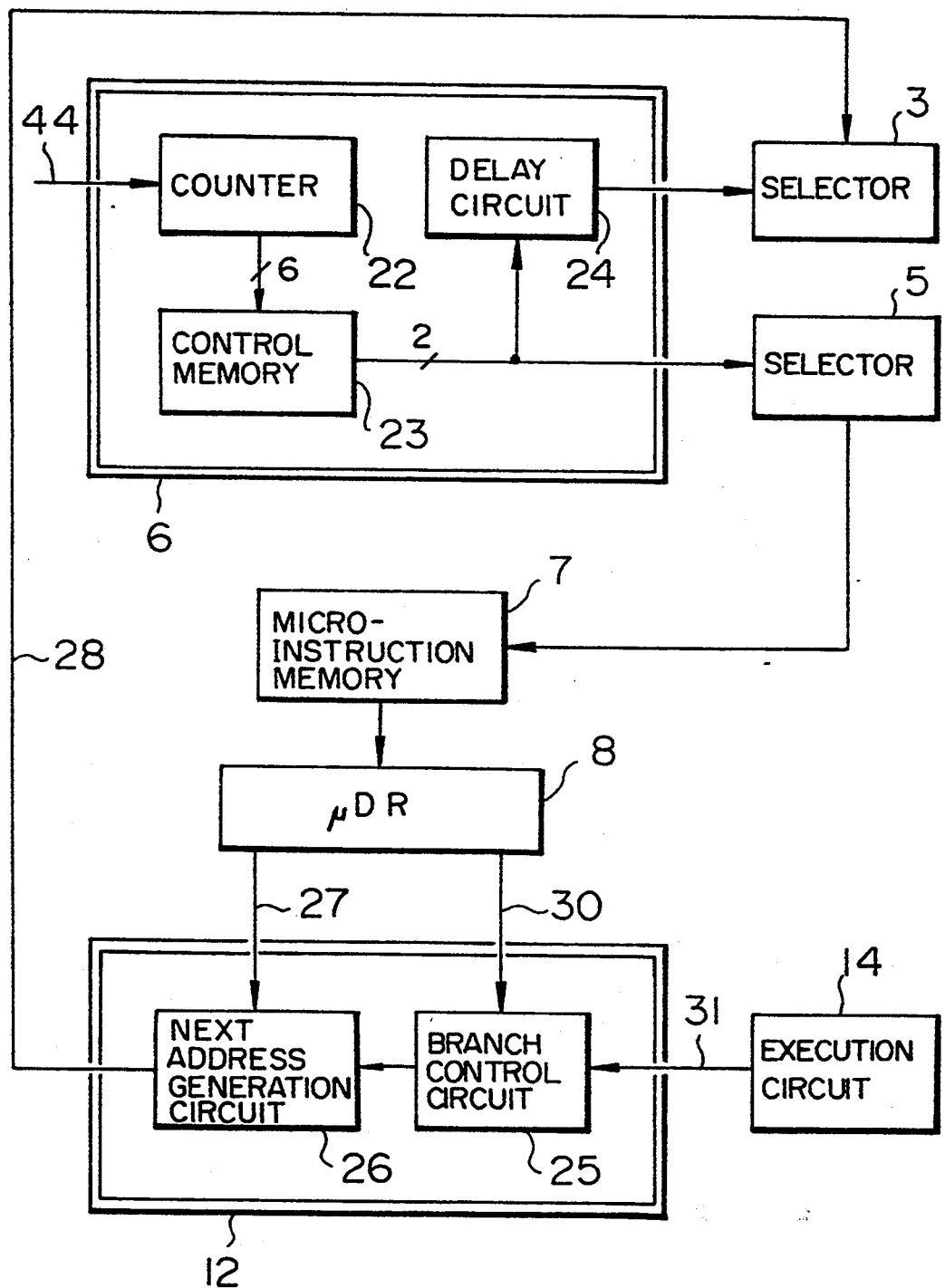
FIG. 2 of the time-division of a time-division control circuit, microaddress control circuit and their peripheral circuits.

FIG. 2 Shows the arrangement of principal portions of the time-division control circuit 6 and microaddress control circuit 12. The time-division control circuit 6 consists of 6-bit loop counter 22 to which a clock line 44 is connected, a control memory 23 which is controlled by the loop counter 22, and a delay circuit 24.

The control memory 23 stores 64 2-bit words and reads out data by being addressed by a count value of the 6-bit loop counter 22. Data read out of the control memory is sent to the first selector 5, which then selects one of the multiplexer input lines 43 shown in FIG. 1 and delivers it as the address of the microinstruction memory 7. The data is also sent to the selector 3 by way of the delay circuit 24 which delays the data transfer by one clock period, and selects the microaddress register corresponding to the selected multiplexer input line 43. Consequently, the next address generated by the execution result is stored in the same address register as selected by the first selector 5.

The microaddress control circuit 12 consists of a branch control circuit 25 and a next address generation circuit 26. The branch control circuit 25 judges the branch condition based on the branch information provided by the microinstruction memory 7 over a signal line 30 and state signals (carry, zero, etc.) produced as a result of operation of the execution circuit 14 received over a state signal output line 31. If the branch condition is met, the lowest order bit of the next address read line 27 is inverted so as to produce the next address, or if the condition is not met the address on the next address read line 27 is specified intact to be the next address. Consequently, conditional branching of the microprogram is made possible. The output of the next address generation circuit 26 is sent to the selector 3 over a next address signal line 28.

The microinstruction memory 7 and control memory 23 can be RAMs (random access memory), ROMs (read only memory), PROM (programmable read only memory), or the like. Using RAMs enables the dynamic alteration of the contents, although it necessitates a circuit for initializing the program after the microprocessor has been turned on. Using ROMs enables the reduction of circuit space, although it does not allow the user to alter the program. Using PROMs eliminates the need of program initialization following power-on and also enables the user to write programs into them.

Figure 3:
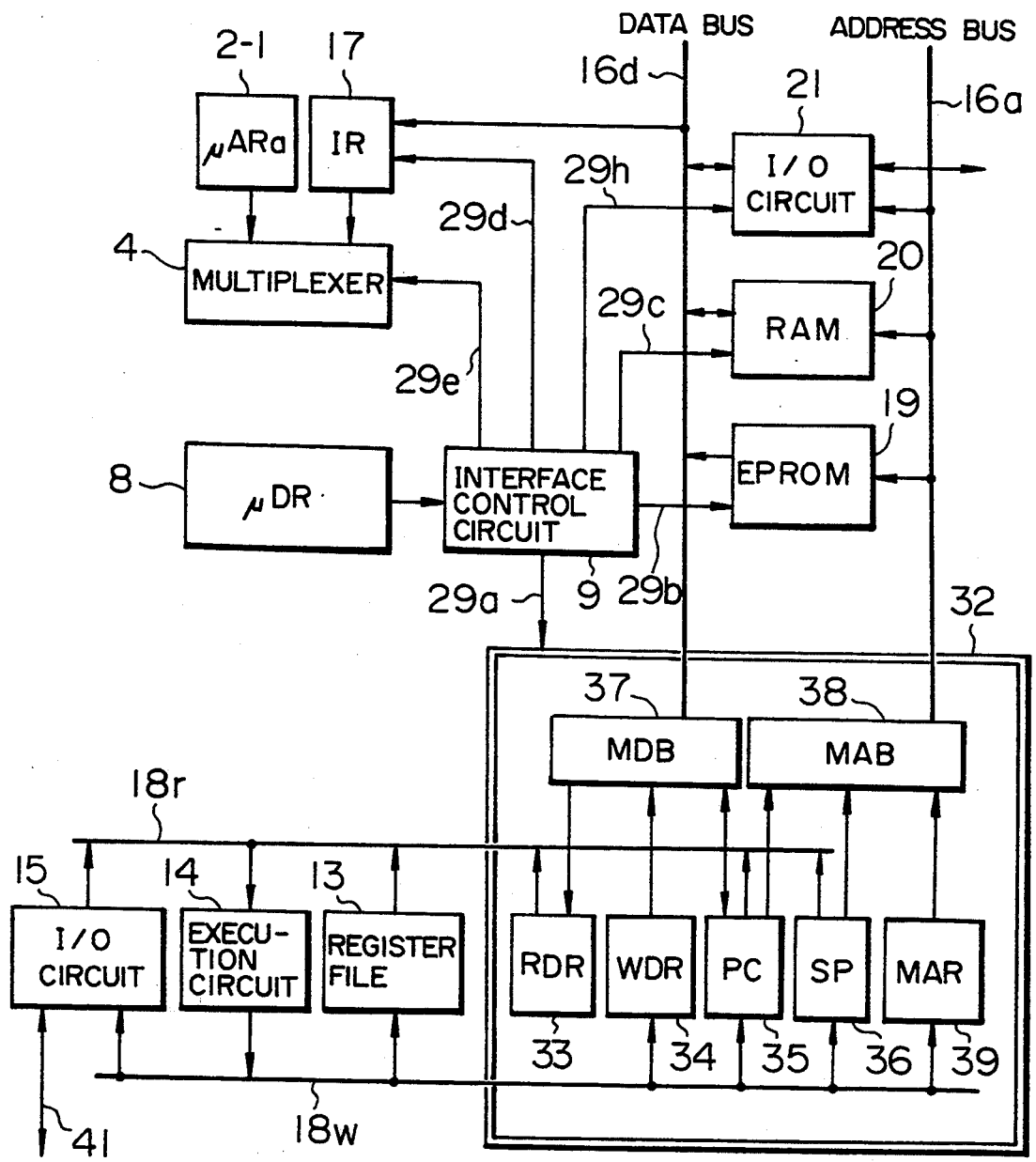
FIG. 3 is a block diagram of an interface circuit and its peripheral circuits based on a first embodiment.

FIG. 3 shows the arrangement of the principal portions of the interface circuit 32, internal data bus 18 (read bus 18r and write bus 18w) and peripheral bus 16 (address bus 16a and data bus 16d) connected to the circuit 32. The interface circuit 32 includes the following functional blocks.

Memory data buffer (MDB) 37: This bidirectional buffer in connection with the data bus 16d is connected with a read data register 33, write data register 34, and program counter 35.

Memory address buffer (MAB) 38: This output buffer in connection with the address bus 16a places the contents of the program counter 35, stack pointer 36 or memory address register 39 on the address bus 16a as an address of a register included in the EPROM 19, RAM 20 or input/output circuit 21.

Read data register (RDR) 33: This register introduces data on the data bus 16d through the memory data buffer 37 and places the data on the read bus 18r.

Write data register (WDR) 34: This register introduces data on the write bus 18w and places the data on the data bus 16d through the memory data buffer 37.

Program counter (PC) 35: The internal data bus 18 is connected to the memory data buffer 37 and memory address buffer 38. Normally, the program counter provides a memory address for the address bus 16a through the memory address buffer 38. The count value of the program counter is revised by being sent over the read bus 18r to the execution circuit 14, in which it is subjected to an incremental, additional or other operation, and returned to the program counter 35 over the write bus 18w.

Stack pointer (SP) 36: This is connected with the internal data bus 18 and memory address buffer 38. It saves the contents of the program counter 35 in the RAM 20 at the execution of a subroutine call instruction (CAL) and returns the saved value in the RAM 20 to the program counter 35 in response to the return instruction (RET). The value of the stack pointer is revised by the operation circuit 14 in the same manner as for the program counter 35.

Memory address register (MAR) 39: This is connected with the write bus 18w and memory address buffer 38 and has its contents (memory address) set by the execution of a microinstruction. The address is placed on the address bus 16a through the memory address buffer 38.

The foregoing interface circuit 32 is controlled in response to a signal 29a which is produced by the interface control circuit 9 based on data in the microdata register 8. The interface control circuit 9 also produces a read signal 29b for the EPROM 19, a read/write signal 29c for the RAM 20, a read/write signal 29h for the input/output circuit 21, a write signal 29d for the macroinstruction register 17, and a selection signal 29e for the multiplexer 4.

Information in the registers, program counter and stack pointer of the interface circuit 32 and information in the registers of the register file 13 and input/output circuit 15 are described in the register field of the microinstruction memory 7.

Figure 11:
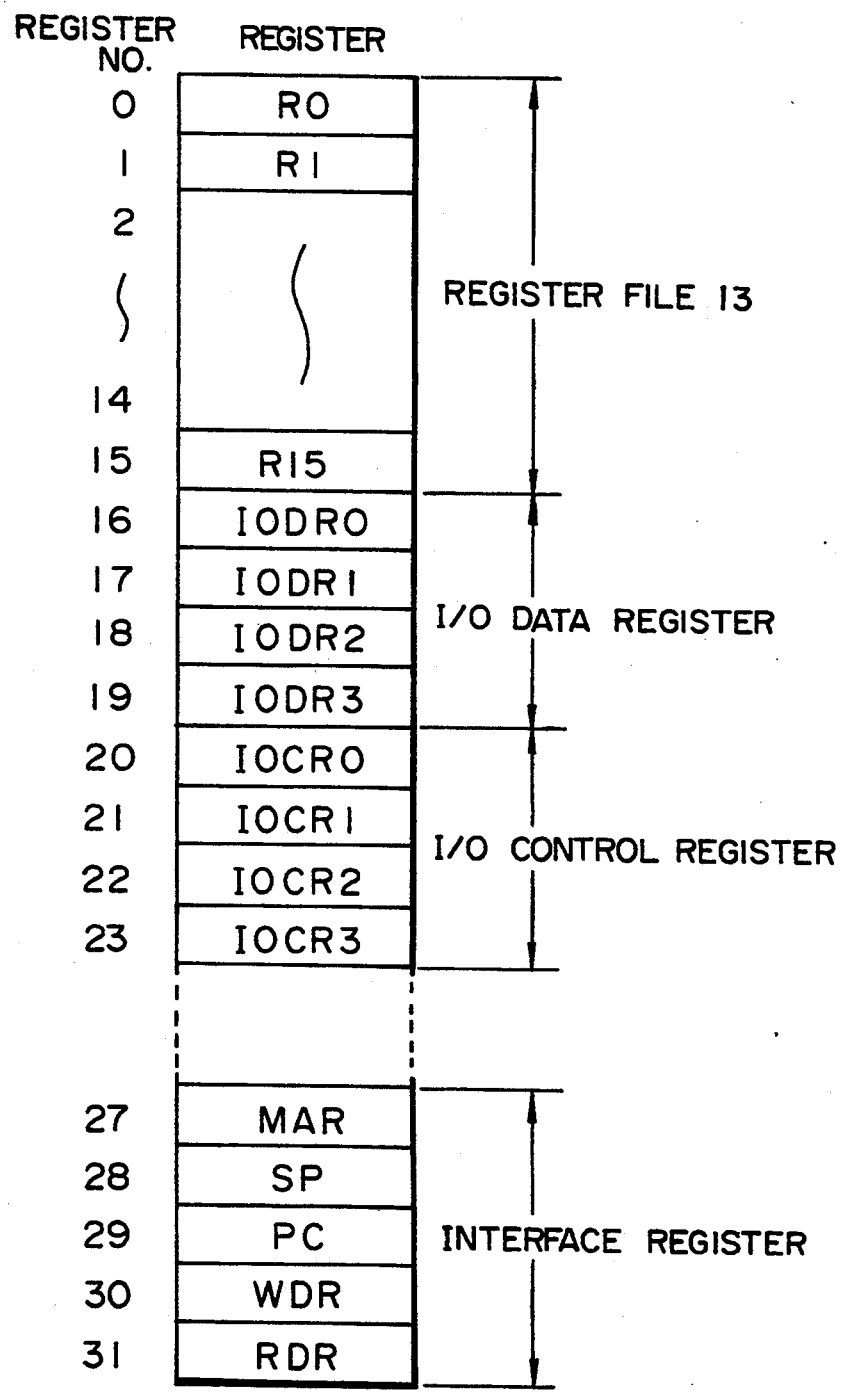
FIG. 11 is a diagram of register mapping.

FIG. 11 shows a mapping of registers described in the register field. Labeled by IODR are input/output data registers which perform data input from external terminals and data output to external terminals. Labeled by IOCR are input/output control registers associated with the input/output data registers, and they control the function of output terminals and the data transfer direction.

Figure 4:
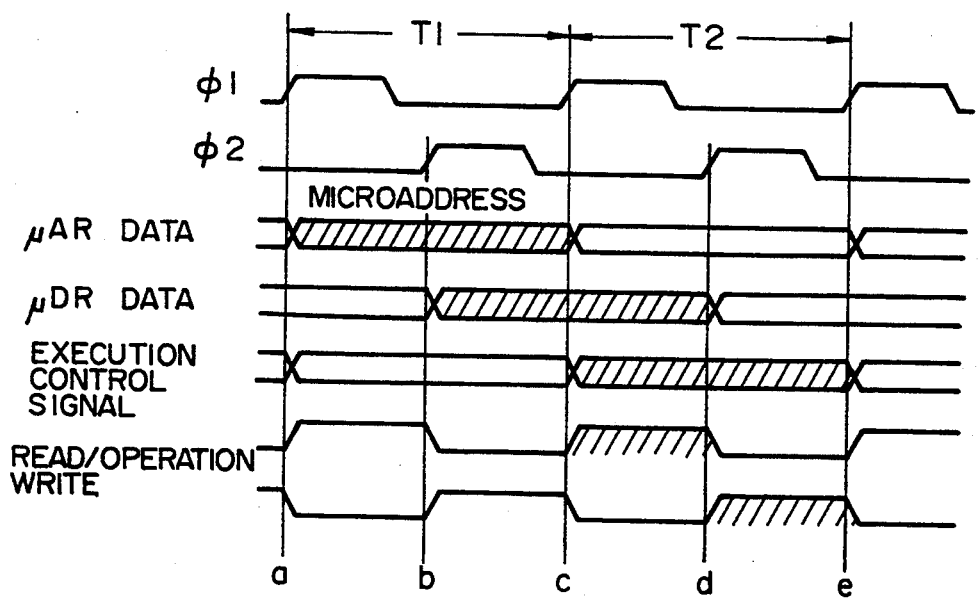
FIG. 4 is a timing chart showing the execution of a microinstruction.

FIG. 4 is a timing chart showing the execution of a microinstruction. The operation is based on nonoverlap 2-phase clocks $\phi 1$ and $\phi 2$. Indicated by T1 is the microinstruction read cycle and T2 is the microinstruction execution cycle. The operation includes the following events <1> through <5>.

<1> The microinstruction memory 7 is addressed during the period between time points a and c by the address placed on one of the multiplexer input lines 43 selected by the first selector 5, and data is read out of it.

<2> The output data of the microinstruction memory 7 is latched in the microdata register 8 at time point b, and is kept active during the b-d period.

<3> The microdata register 8 has its output fed to the interface control circuit 9, register control circuit 10, execution control circuit 11, microaddress control circuit 12, and input/output control circuit 40, and these control circuits produce execution control signals and keep the signals active during the c-e period.

<4> In the former half of the T2 cycle (c-d period), data in the selected registers among those in the register file 13, registers in the input/output circuit 15 and registers in the interface circuit 12 is read and processed. The result of the process including the zero and carry states is settled at time point d.

<5> In the latter half of the T2 cycle (d-e period), write operations for the result of processing in the c-d period take place. The operations include writing to the selected registers among those in the register file 13, registers in the input/output circuit 15, registers in the interface circuit 12, and microaddress register 2 which has been treated in parallel. Written into the microaddress register 2 selected by the time-division control circuit 6 is the next address which is produced from information of the branch condition retrieved from the microinstruction memory 7 over the signal line 30, and information of carry and zero states provided by the execution circuit 14 over the signal line 31, as explained in connection with FIG. 2.

Through the foregoing operation, two-level pipeline control is made possible. Namely, reading of a microinstruction to be executed next and execution of the microinstruction which has been read one cycle ago can take place concurrently in the a–c period, and execution of the microinstruction which has been read in the a–c period and reading of a microinstruction to be executed next can take place concurrently in the c–e period.

Figure 5:
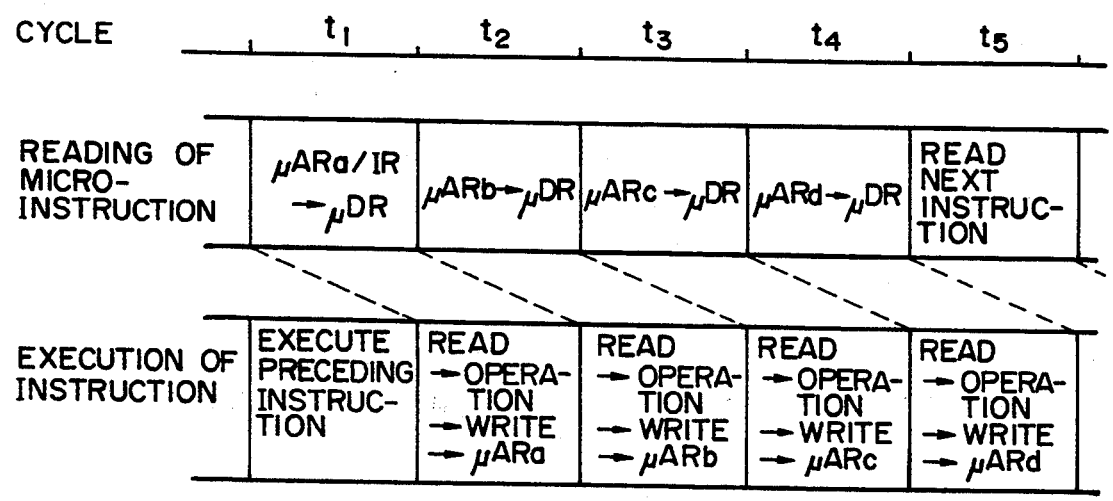
FIG. 5 is a diagram explaining pipeline control.

FIG. 5 shows, as an example, the progression of execution under the pipeline control. In this example, the control memory 23 of the time-division control circuit 6 stores a time-division control program including binary data as information on the order of selecting a microaddress register 2, as follows.

$$\ldots \rightarrow [00] \rightarrow [01] \rightarrow [10] \rightarrow [11] \rightarrow \ldots$$

Accordingly, registers among the microaddress registers are selected in the following order.

$$\ldots \rightarrow (2\text{-}1) \rightarrow (2\text{-}2) \rightarrow (2\text{-}3) \rightarrow (2\text{-}4) \rightarrow \ldots$$

Namely, the above selection order information is read out of the control memory 23 sequentially in response to the advancement of the counter 22.

The following explains the operational cycle of selecting the microaddress register 2-1. In the t1 cycle, a microinstruction associated with the microaddress register 2-1 or macroinstruction register 17 is read, and the microinstruction which has been read one cycle ago (preceding instruction) is executed. In the t2 cycle, a microinstruction associated with the microaddress register 2-2 is read and the microinstruction associated with the microaddress register 2-1 or macroinstruction register 17 is executed. Similarly, in the t3 and following cycles, reading of a next instruction and execution of a preceding instruction take place concurrently.

Figure 6:
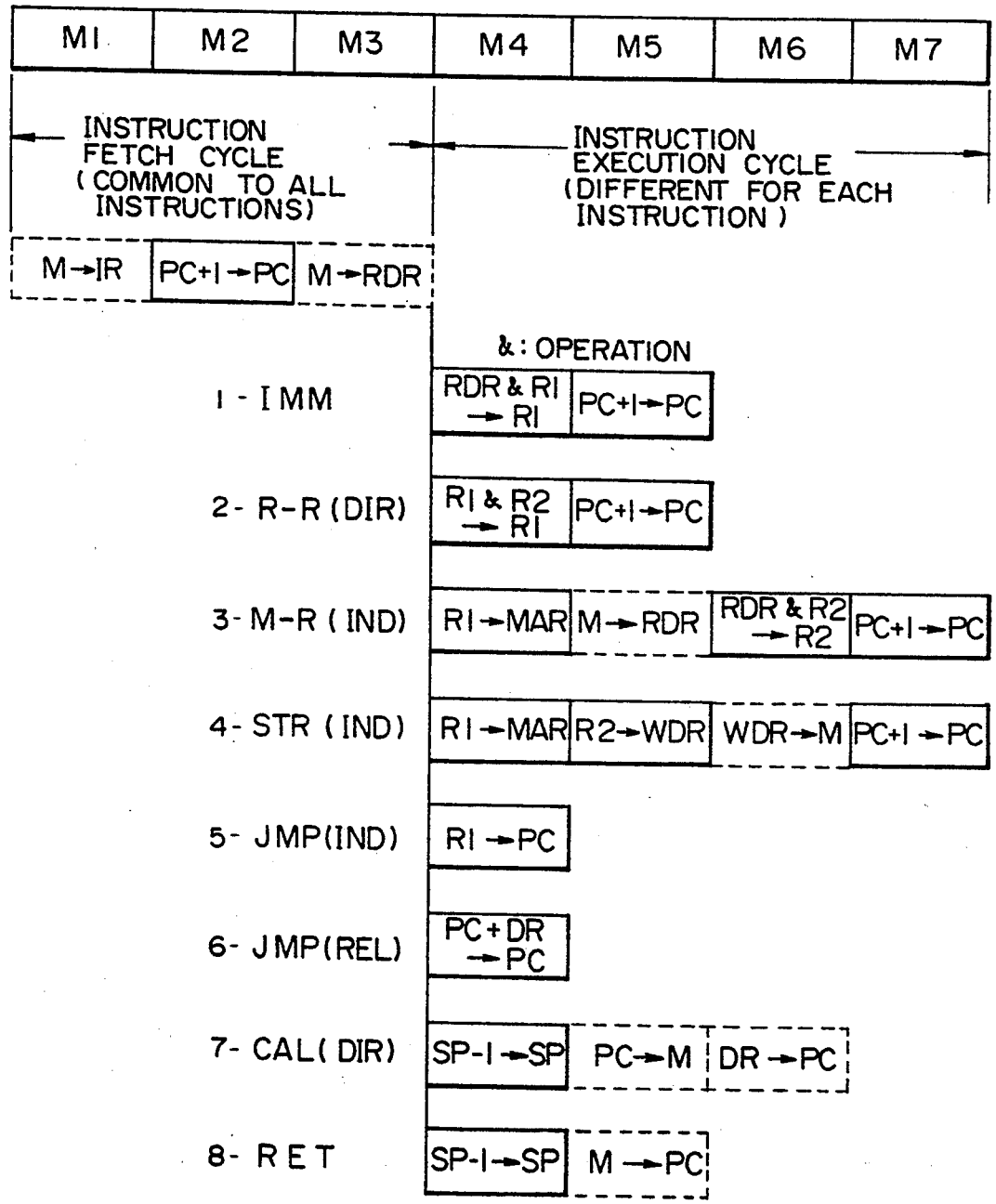
FIG. 6 is a diagram explaining the execution sequence of a macroinstruction.

FIG. 6 shows, as an example, a macroinstruction and its execution sequence. The macroinstruction sequence is divided into a macroinstruction fetch cycle (machine cycles M1–M3) and a macroinstruction execution cycle (machine cycles M4–M7). The macroinstruction fetch cycle is common to all macroinstructions, while the macroinstruction execution cycle is different in the process and the number of machine cycles depending on the type of macroinstruction.

The operation of these machine cycles is controlled by the interface control circuit 9 as follows.

M1: In this cycle, a memory address from the program counter 35 in FIG. 3 is placed on the address bus 16a by way of the memory address buffer 38. At the same time, read signals are issued to the memories 19 and 20 and input/output circuit 21 in connection with the address bus 16a. The first word of the macroinstruction (shown by M in FIG. 6) from the selected memory or input/output circuit is placed on the data bus 16d, and is loaded into the macroinstruction register 17 in connection with the data bus 16d in response to the issuance of the write signal 29d to the macroinstruction register 17.

M2: The contents of the program counter 35 are fed over the read bus 18r to the execution circuit 14, which adds one and returns the result to the program counter 35 over the write bus 18w, and the address information is incremented.

M3: Similar to the M1 cycle, a memory address from the program counter 35 is placed on the address bus 16a by way of the memory address buffer 38 so that the second word of the macroinstruction is placed on the data bus 16d, and it is loaded into the read data register 33 by way of the memory data buffer 37.

The following explains the machine cycles M4-M7 by taking an example of the STR (IND) instruction shown by <4> in FIG. 6. The STR (IND) instruction is a macroinstruction for data transfer (load) based on indirect addressing, and it transfers data in register R1 to another register by using the contents of register R1 as the memory address.

M4: The contents of the register R1 included in the register file 13 are loaded into the memory address register 39 by way of the read bus 18r, execution circuit 14 and write bus 18w. In this case, the execution circuit 14 merely passes the data intact without any operation.

M5: Similar to M4, the contents of the register R2 included in the register file 13 are loaded into the memory address register 34.

M6: The contents of the memory address register 39 are placed on the address bus 16a so that the contents of the write data register 34 are read out onto the data bus 16d, and the data is loaded into the register of the memory 19 or 20 or the input/output circuit 21.

M7: The address information in the program counter 35 is incremented in the same manner as the above-mentioned M2 cycle, and the macroinstruction sequence is completed.

Among the M1 through M7 cycles, only the M4 cycle reads out the microinstruction memory 7 by using the contents of the macroinstruction register 17 as the address, and the remaining cycles read out the microinstruction memory 7 by using the contents of the microaddress register 2-1 as the address. Switching is controlled by the output 29e of the interface control circuit 9 shown in FIG. 3. The order of execution of microprograms for a macroinstruction sequence and microprograms associated with other microaddress registers 2-2, 2-3 and 2-4 is established as a time-division control program in the control memory 23 shown in FIG. 2.

Figure 7:
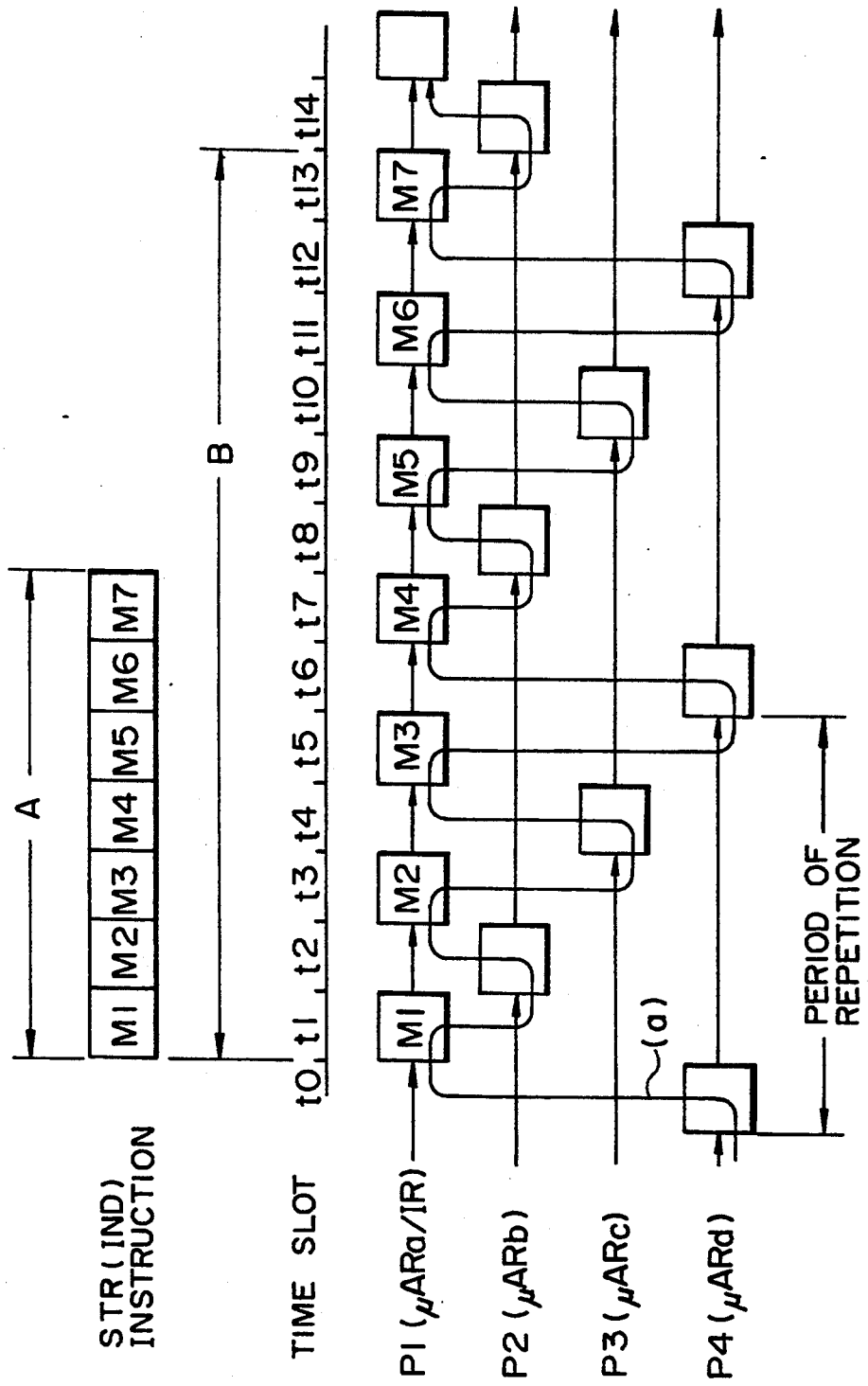
FIG. 7 a diagram explaining a first example of the operation of the time-division control.

FIG. 7 shows an example of the time-division control program. Shown in the figure is only the microinstruction execution cycle T2 among the two cycles T1 and T2 illustrated in FIG. 4.

In FIG. 7, the time-division control program runs four independent microprograms P1, P2, P3 and P4 in the order shown by (a).

The microprogram (a microprogram which executes a macroinstruction) P1 associated with the macroinstruction register 17 and microaddress register 2-1 is run dividedly for each word in time slots t1, t3, t7, t9, t11, t13, and so on. The microprogram P2 associated with the microaddress register 2-2 is run in time slots t2, t8, t14, and so on. The microprogram P3 associated with the microaddress register 2-3 is run in time slots t4, t10, and so on. The microprogram P4 associated with the microaddress register 2-4 is run in time slots t0, t6, t12, and so on.

Namely, the time-division control of this example has a period consisting of time slots t0-t5, in which the microprogram P1 is run three times, and in which the microprograms P2, P3 and P4 are run once each. The macroinstruction STR (IND) having machine cycles M1-M7 (shown by A in FIG. 7) is executed by being expanded in time slots t1-t13 (shown by B in FIG. 7) by the time-division control program.

Figure 8:
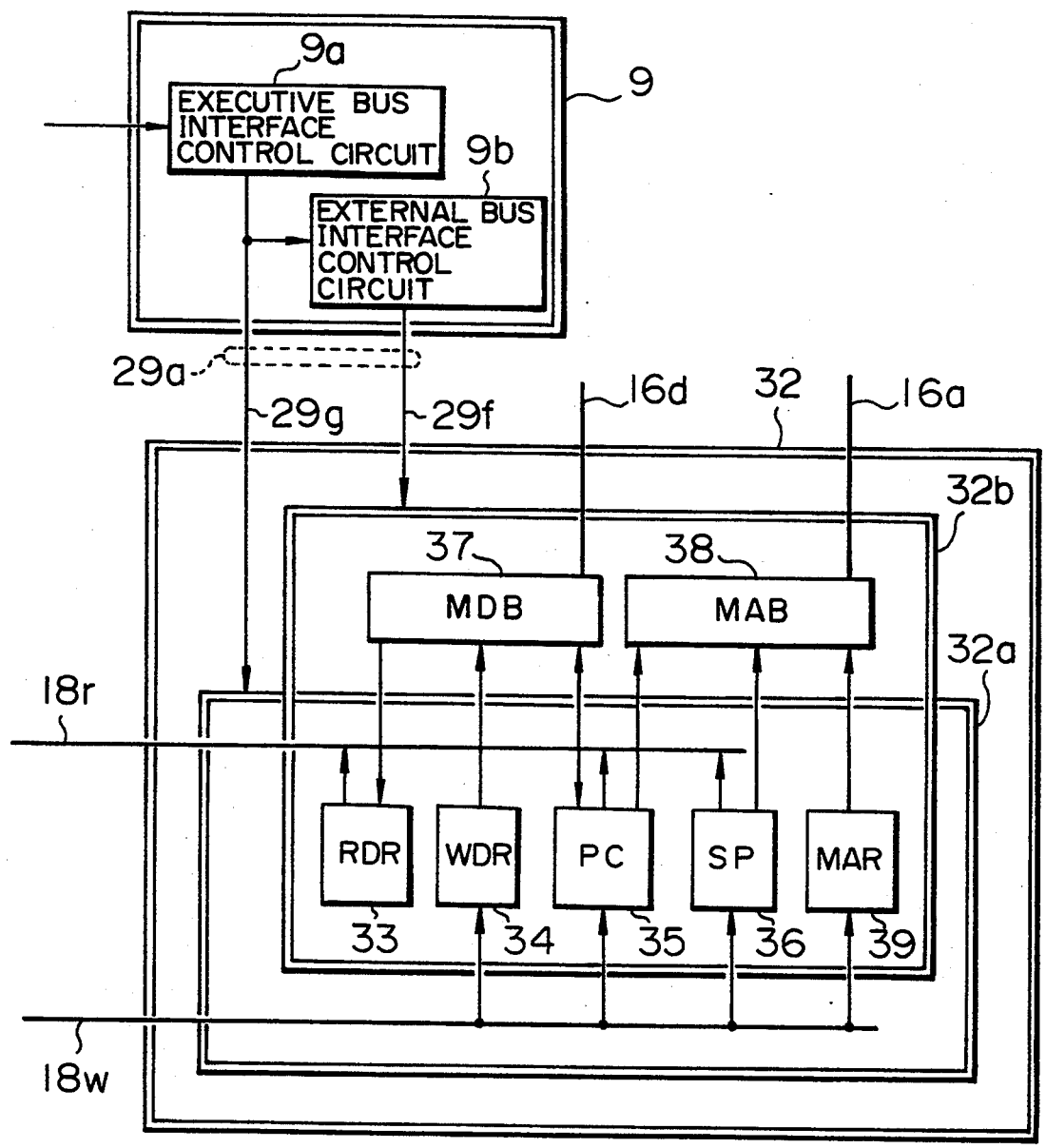
FIG. 8 is a block diagram of the interface circuit and its peripheral circuits based on a second embodiment.

FIG. 8 shows the second embodiment of the interface circuit 32 and interface control circuit 9. The interface circuit 32 consists of an executive bus interface circuit 32a and an external bus interface circuit 32b. The interface control circuit 9 consists of an executive bus interface control circuit 9a, which controls the executive bus interface circuit 32a, and an external bus interface control circuit 9b, which controls the external bus interface circuit 32b.

In the macroinstruction process sequence shown in FIG. 6, the operations enclosed in dashed line blocks (corresponding to the common machine cycles M1 and M3, the M6 cycle for the STR (IND) instruction, and so on) can take place without using the executive data bus 18 and execution circuit 14. Therefore, the embodiment of FIG. 8 is designed to let an execution without using the bus 18 and execution circuit 14 take place automatically in the machine cycle following an execution using the bus 18 and operation circuit 14. On this account, the executive bus interface control circuit 9a sends the information on the executive bus interface control line 29g for controlling the executive bus interface circuit 32a also to the external bus interface control circuit 9b. Based on this information, the external bus interface control circuit 9b produces and delivers a control signal 29f for the external bus interface control circuit 32b in the next cycle.

Figure 9:
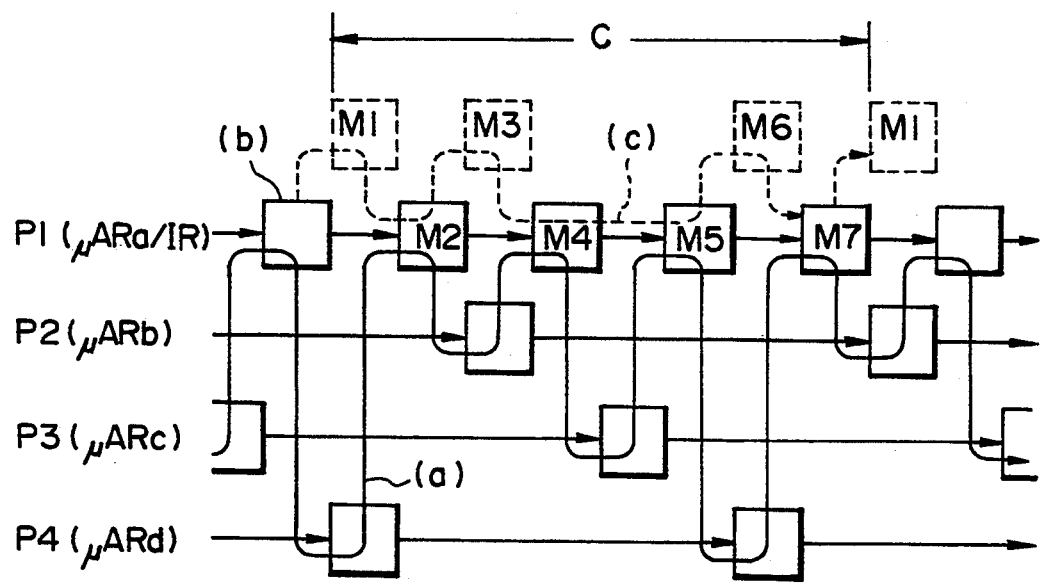
FIG. 9 is a diagram explaining a second example of the operation of the time-division control.

FIG. 9 shows an example of operation based on the foregoing control scheme. The time-division control program and the operation of the microprograms P2, P3 and P4 shown by (a) are the same as the example of FIG. 7. A sequence formed of cycles M1 through M7 shown in FIG. 9 is initiated by the execution of the last microprogram shown by (b) of the macroinstruction before the microprogram P1, and the process proceeds as shown by the arrow (c). During the process, operations and register file access in the M2, M4, M5 and M7 cycles by the execution circuit 14 are carried out by the respective microprograms. Operations of the M1, M3 and M6 cycles unnecessary for the operations and register file access by the execution circuit 14 are carried out sequentially by the interface circuit 12 in synchronism with the microprograms. A macroinstruction is executed in the time period shown by C.

Accordingly, the second embodiment of FIG. 8 can execute a macroinstruction in a shorter time as compared with the first embodiment shown in FIG. 3.

Figure 10:
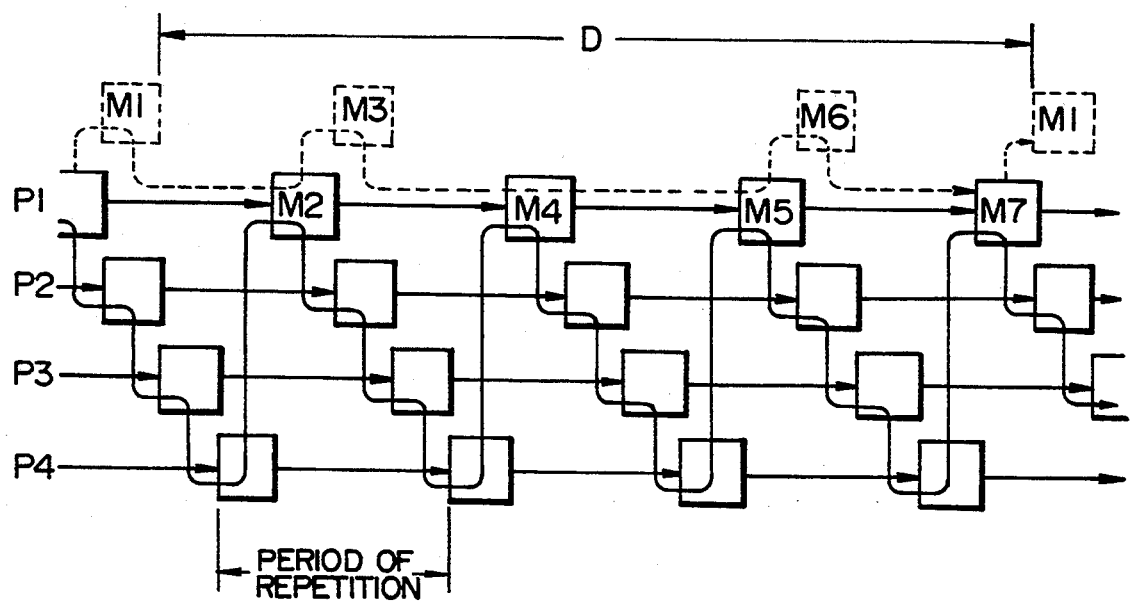
FIG. 10 is a diagram explaining a third example of the operation of the time-division control.

FIG. 10 shows an example of an operation with the time-division control program being modified. In this operation, the microprograms P2, P3 and P4 are repeated at a shorter interval as compared with the example of FIG. 9, and an enhanced processing speed is achieved in exchange for the slower execution of the microprogram P1.

In this manner, it is possible to create a time-division control program arbitrarily so that intended microprograms are run more frequently for the achievement of fast execution. Although the example shown in FIG. 10 is based on the interface control scheme of FIG. 8, using the interface control scheme of FIG. 3 provides the same result.

It will be appreciated from the above explanation that the microprocessor 1 can run concurrently a macroprogram which is introduced through the external bus and three independent microprograms which are intended for real-time processing.

Various memory devices and input/output circuits connected to the external bus can readily be extended, and a large-scale program can be organized. The input/output circuit 15 connected to the executive data bus 18 is controlled directly by microprograms, and therefore the microprocessor is highly responsive to the data input. Microprograms can be created by the user, and therefore the microprocessor can readily be adapted to the alteration of specifications of application systems.

The inventive microprocessor, though it is based on a single processor, can run programs of different kinds concurrently, and this compact equipment accomplishes intricate functions required by extensive application systems. The user can create a plurality of application programs independently, and program development is made easier and development time is reduced.

What is claimed is:

1. A microprocessor comprising:
   a plurality of microaddress registers for holding microaddresses;
   a macroinstruction register for holding a macroinstruction;
   a microinstruction memory for storing a plurality of microinstructions;
   a macroinstruction memory for storing a plurality of macroinstructions;
   a first selector which either selects one of said microaddress registers or said macroinstruction register in response to a first control signal, and reads out the contents of the selected register for use as an address of said microinstruction memory;
   microinstruction execution means which carries out a process based on a microinstruction read out of said microinstruction memory in accordance with said address, and generates a next macroinstruction address or next microinstruction address;
   macroinstruction read control means which makes access to said macroinstruction memory in accordance with said next macroinstruction address thereby to read out a next macroinstruction, and loads said next macroinstruction into said macroinstruction register;
   a second selector which selects one of said microaddress registers in response to a second control signal and loads said next microinstruction address into the selected microaddress register; and
   time-division control means for controlling the selecting operations of said first and second selectors by supplying said first and second control signals on a time-division basis.

2. A microprocessor according to claim 1, wherein said time-division control means includes a control memory which stores a program that determines the order of said selecting operations.

3. A microprocessor according to claim 2, wherein said microinstruction memory comprises a programmable memory.

4. A microprocessor according to claim 2, wherein said control memory comprises a programmable memory.

5. A microprocessor according to claim 1, wherein said microinstruction memory comprises a programmable memory.

6. A microprocessor according to claim 1, wherein said microinstruction execution means carries out said process based on the microinstruction read out of said microinstruction memory while concurrently generating the next macroinstruction address or next microinstruction address.

7. A microprocessor comprising:
   first control means which includes first memory means for storing first control data, second memory means for storing second control data corresponding to said first control data, and a first control unit;
   execution means which reads out said first control data from said first memory means and transfers the first control data to said first control unit, said first control unit controlling said execution means in accordance with the second control data provided by said execution means; and
   second control means which includes a third memory means for storing third control data, and a second control unit; said second control unit controlling an operation cycle of control of said execution means by said first control unit in accordance with the third control data read out from said third memory means.

8. A microprocessor according to claim 7, wherein said first control means includes a plurality of address registers for holding address information used to read said second control data out of said second memory means, said first control data provided by said execution means being held in a first address register among said address registers.

9. A microprocessor according to claim 8, wherein said execution means generates address information used to read said second control data out of said second memory means, and said first control means includes means for holding said address information in an address register different from said first address register among said address registers.

10. A microprocessor according to claim 9, wherein said second memory means has a first memory area which is accessed by said first control unit dependent on said first control data, and a second memory area which is accessed by said first control unit independently of said first control data.

11. A microprocessor according to claim 10, wherein at least one of said second memory means and said third memory means comprises a programmable memory.

12. A microprocessor according to claim 10, wherein said first memory means and said first control unit are formed in separate semiconductor circuit devices.

13. A microprocessor according to claim 9, wherein at least one of said second memory means and said third memory means comprises a programmable memory.

14. A microprocessor according to claim 13, wherein said first memory means and said first control unit are formed in separate semiconductor circuit devices.

15. A. microprocessor according to claim 9, wherein said first memory means and said first control unit are formed in separate semiconductor circuit devices.

16. A microprocessor according to claim 9, wherein said execution means generates said address information used to read said second control data out of said second memory means concurrently with said transfer of the first control data to said first control unit.

17. A microprocessor according to claim 8, wherein said second memory means has a first memory area which is accessed by said first control unit dependent on said first control data, and a second memory area which is accessed by said first control unit independently of said first control data.

18. A microprocessor according to claim 17, wherein said first memory means and said first control unit are formed in separate semiconductor circuit devices.

19. A microprocessor according to claim 17, wherein at least one of said second memory means and said third memory means comprises a programmable memory.

20. A microprocessor according to claim 19, wherein said first memory means and said first control unit are formed in separate semiconductor circuit devices.

21. A microprocessor according to claim 8, wherein said first memory means and said first control unit are formed in separate semiconductor circuit devices.

22. A microprocessor according to claim 8, wherein at least one of said second memory means and said third memory means comprises a programmable memory.

23. A microprocessor according to claim 22, wherein said first memory means and said first control unit are formed in separate semiconductor circuit devices.

24. A microprocessor according to claim 7, wherein said second memory means has a first memory area which is accessed by said first control unit dependent on said first control data, and a second memory area which is accessed by said first control unit independently of said first control data.

25. A microprocessor according to claim 24, wherein said first memory means and said first control unit are formed in separate semiconductor circuit devices.

26. A microprocessor according to claim 24, wherein at least one of said second memory means and said third memory means comprises a programmable memory.

27. A microprocessor according to claim 26, wherein said first memory means and said first control unit are formed in separate semiconductor circuit devices.

28. A microprocessor according to claim 7, wherein at least one of said second memory means and said third memory means comprises a programmable memory.

29. A microprocessor according to claim 28, wherein said first memory means and said first control unit are formed in separate semiconductor circuit devices.

30. A microprocessor according to claim 7, wherein said first memory means and said first control unit are formed in separate semiconductor circuit devices.

31. A control method used in a microprocessor which comprises a plurality of microaddress registers for holding microaddresses, a macroinstruction register for holding a macroinstruction, a microinstruction memory for storing a plurality of microinstructions, and a macroinstruction memory for storing a plurality of macroinstructions, said method comprising the steps of:
(a) selecting either one of said microaddress registers or said macroinstruction register, and reading out the contents of the selected register for use as an address of said microinstruction memory;
(b) carrying out a process based on a microinstruction read out of said microinstruction memory in accordance with said address, and generating a next macroinstruction address or next microinstruction address;
(c) making access to said macroinstruction memory in accordance with said next macroinstruction address thereby to read out a next macroinstruction, and loading said next macroinstruction into said macroinstruction register;
(d) selecting one of said microaddress registers and loading said next microinstruction address into the selected microinstruction register; and
(e) controlling the selecting operations of said step (a) and step (d) on a time-division basis.

32. A control method according to claim 31, wherein said next macroinstruction address or next microinstruction address is generated in step (b) concurrently with said reading out performed in step (a).

33. A microprocessor, comprising:
a plurality of microaddress registers each storing microaddresses;
a macroinstruction register holding a macroinstruction;
selector means for selecting one register among said plurality of microaddress registers and said macroinstruction register according to a control signal;
a time-division control circuit for producing said control signal to control the selecting operation of said selector means on a time-division basis; and
means for executing a process designated by a content of the register selected by said selector means.

* * * * *